United States Patent [19]
Basset

[11] Patent Number: 5,812,867
[45] Date of Patent: Sep. 22, 1998

[54] INTEGRATED CIRCUIT COMPRISING A MICROPROCESSOR, A MEMORY AND INTERNAL CONFIGURABLE PERIPHERALS

[75] Inventor: Philippe Basset, Meylan, France

[73] Assignee: SGS-Thomson Microelectronics, S.A., France

[21] Appl. No.: 573,429

[22] Filed: Dec. 15, 1995

Related U.S. Application Data

[63] Continuation of Ser. No. 177,624, Jan. 5, 1994, abandoned.

[30] Foreign Application Priority Data

Jan. 13, 1993 [FR] France ................... 93 00243

[51] Int. Cl.$^6$ .................................. G06F 13/00
[52] U.S. Cl. .................... 395/800.01; 395/284; 395/828; 395/651; 395/653
[58] Field of Search ................... 395/800, 284, 395/828, 830, 834, 481, 651, 652, 653

[56] References Cited

U.S. PATENT DOCUMENTS

| | | | |
|---|---|---|---|
| 4,796,234 | 1/1989 | Sparks et al. | 365/228 |
| 5,193,199 | 3/1993 | Dalrymple et al. | 395/775 |
| 5,220,673 | 6/1993 | Dalrymple et al. | 395/775 |
| 5,257,380 | 10/1993 | Lang | 395/700 |
| 5,307,464 | 4/1994 | Akao et al. | 395/325 |
| 5,426,744 | 6/1995 | Sawase et al. | 395/569 |
| 5,455,923 | 10/1995 | Kaplinsky | 395/481 |

FOREIGN PATENT DOCUMENTS

| | | |
|---|---|---|
| 0500973 | 2/1992 | European Pat. Off. . |
| 500 973 | 2/1992 | European Pat. Off. . |
| 536 756 | 4/1993 | European Pat. Off. . |

OTHER PUBLICATIONS

EDN Electrical Design News, vol. 31, No. 4, Février. 1986, Newton, Mass., pp. 171–180 Rowe, 'Bootstrap Firmware Simplifies CPU Programming'.

IEEE Proceedings ICASSP 87 Apr. 1987, Dallas, TX, pp. 523–526, Kloker, 'The Architecture and Applications of the Motorola DSP56000 Digital Signal Processor Family'.
IBM, "Data Integrity of EEPROM Data During Power Up/Down Cycles", IBM Technical Disclosure Bulletin, vol. 32 No. 9B, Feb. 1990, pp. 277–278.
Kloker, "The Architecture and Applications of the Motorola DSP56000 Digital Signal Processor Family ", IEEE Proceeding sICASSP, Apr. 1987, pp. 523–526.
Twaddell, "Erasable/Programmable Semiconductor Memories", EDN Electrical Design NEws, Jan. 1984, pp. 108–130.
IBM Technical Disclosure Bulletin, vol. 32, No. 9B, Feb. 1990, pp. 227–278; *Data Integrity of EEPROM Data During Power Up/Down Cycles*.
IEEE Proceeding sICASSP, Apr. 1987, pp. 523–526, Kloker, *The Architecture and Applications of the Motorola DSP56000 Digital Signal processor Family*.

*Primary Examiner*—Daniel H. Pan
*Assistant Examiner*—Walter D. Davis, Jr.
*Attorney, Agent, or Firm*—Michael J. Buchenhorner; Gunster, Yoakley, Valdes-Fauli & Stewart

[57] ABSTRACT

An integrated circuit comprises a microprocessor (1), a memory (2) and one or more internal peripherals (3) connected, firstly, to one another and, secondly, to circuits external (4) to this integrated circuit by means of connections circuits (5). The peripherals comprise circuits called options circuits (6) enabling the operation of these peripherals to be configured. For an operating session corresponding to putting of the integrated circuit into service, the operations of these peripherals are defined as a function of information elements stored in the the first part of the memory (7). The memory also has a second part (8) designed to store instructions that can be executed by the microcontroller. This configuration of the peripherals takes place when the integrated circuit is put into service, by the linking of said peripherals to said first part of the memory. This memory is of the programmable type. The circuits known as options circuits possess means for being configured by default for a particular mode of operation of the microprocessor of the integrated circuit called the programming mode. In this mode, this microprocessor is capable of writing in the first part of the memory.

43 Claims, 3 Drawing Sheets

INTEGRATED CIRCUIT COMPRISING A MICROPROCESSOR, A MEMORY AND INTERNAL CONFIGURABLE PERIPHERALS

This application is a continuation of application Ser. No. 08/177,624, filed Jan. 5, 1994 and now abandoned.

CROSS REFERENCE TO RELATED APPLICATIONS

This application claim priority from French App'n 93-00243, filed Jan. 13, 1993.

BACKGROUND OF THE INVENTION

1. Field of the Invention

The present invention relates to an integrated circuit comprising a microprocessor, an electrically programmable memory and one or more internal peripherals. A circuit of this type is a microcontroller. The invention is aimed at facilitating the use of these microcontrollers.

Microcontrollers are systems generally formed by a microprocessor or central processing unit, a memory usually read-only containing the program that must be used by the microcontroller, and one or more internal peripherals needed for the operation of the system. These peripherals may include, for example, a digital display controller, a counter, a clock or a digital/analog converter.

2. Description of the Related Art

The read-only memories used in current state of the art are of two types: first of all, there are non-volatile memories known as ROMs that can be only read, the program that they contain being stored permanently in silicon, (as defined by masking at the time of manufacture). Furthermore, there are known non-volatile, electrically erasable programmable memories called EPROMs that can be read and written in. The program that they contain is erasable by ultraviolet rays (these are UVPROMs in which the erasure can only be done totally) or erasable electrically (EEPROMs where the erasure can be done partially or totally).

ROMs and EPROMs can be differentiated from each other according to the economic and utilitarian viewpoints.

From an economic viewpoint, microcontrollers provided with a ROM are far less costly provided that they are mass-produced. The magnitude must be in the range of a thousand units at least. The program of these microcontrollers is permanently fixed. They are designed for a given application and are therefore manufactured to order. The microcontrollers designed for an EPROM are more likely to be designed for small batches. Their cost is greater owing to the technologies used, especially as regards the UVPROMs which require a quartz window and a ceramic package. However, the fact that they can be programmed means that the user can find equipment, suited to his requirements, that is commercially available and for which he does not have to shoulder the manufacturing and development costs all by himself.

From an utilitarian viewpoint, a microcontroller provided with an EPROM can be used to overcome errors, if any, in the program since it is reprogrammable. On the other hand, if programming errors appear in a microcontroller fitted out with a ROM, nothing can be done about it. The microcontroller has to be manufactured again.

Thus, EPROM-fitted microcontrollers are commonly used to develop and perfect an application. Once the reliability of the program is ensured, the microcontrollers can always be manufactured in their finalized version by providing them with a ROM to reduce their cost.

There are other ways of devising a program. The working of the microcontroller and of its program can be simulated by means of a computer (of the PC type for example). The drawback of this approach is that it is never possible to achieve perfect simulation, owing to the limitation of the modelling, especially when the program is sensitive to precise or critical notions of time, the speed of execution being slower in simulation than in the real circuit. It is also possible to use a so-called emulator circuit which behaves like the microcontroller that it replaces but is an "exploded" version thereof, namely a version in which the internal components are separated. Such an emulator circuit is fitted connection cord, to the end of which there is attached a connector similar to the footprint of the microcontroller, and thus is connected in place of the microcontroller. This system, which can be used to follow the internal signals of the microcontroller in simulating them perfectly, has the best performance characteristics but is also the costliest system.

A microcontroller provided with an EPROM has the advantage of costing far less. It is less precise than an emulator, since there is not the same internal vision of the program available, but it is more precise than a simulator.

The use of a microcontroller provided with EPROMs therefore has a twofold advantage: it enables the choosing of the program of the microcontroller, which the use of ROM memories does not permit and, at the same time, it does not necessitate investment in a costly means of development such as an emulator or a simulator.

With regard to the internal peripherals of the microcontroller, it is possible to choose from among several options of operation at the time of purchase. The term "operating options" designates logic states imposed on certain electrical nodes of the electronic circuits connected to the peripherals. Depending on the values of these logic states, the function of the peripheral circuit is modified. These logic states are necessary for the working of the peripheral. They cannot be undefined. If they are undefined, then there is a risk that, when the microcontroller is turned on, it will not succeed in reaching a proper state of operation. For this reason, the logic states are imposed on the nodes by monostable wired circuits. For example, it is possible to choose a slow counter or a fast counter, a quartz clock or an oscillating circuit, or a converter circuit of higher or lower speed. At present, in the market, these options are fixed by the manufacturers in pre-established ranges. From within these ranges, the user can choose the EPROM-fitted microcontroller that best suits his requirements. These options are chosen by the user before purchase or manufacture. Once defined, these options are programmed definitively at manufacture.

While the use of EPROM-fitted microcontrollers has facilitated the development of the programs, there are no means available in the present state of the art for choosing the desired options of the internal peripherals, these options being stored at the time of manufacture. Thus, any modification of the choice of the options of the internal peripherals dictates a change of microcontroller or the manufacture of new microcontrollers, which is a costly proposition. By contrast, a choice of an option would be particularly useful during the testing of a program when it is discovered that an operating option of an internal peripheral of the microntroller runs counter to or penalizes the normal operation of the circuit in the application being tested.

In the invention, this drawback is overcome by storing the information elements relating to options in an addressable memory which is the same type of memory or the same memory as the one that contains the instructions. To start the microcontroller then, at the end of the operation for turning on the power, the reading of this memory is prompted in order to configure the internal peripheral circuits. This prompted reading is done without the control of the microprocessor of the microcontroller since, without these options, the microcontroller is incapable of working. This memory can furthermore be programmed by forcing the integrated circuit, when the power is turned on, into a specific mode of programming of this memory. In this specific mode, the peripheral circuits are configured by default options.

SUMMARY OF THE INVENTION

The invention therefore relates to an integrated circuit comprising a microprocessor, a memory accessible with an address decoder and one or more internal peripherals connected by connection circuits to one another or to circuits external to this integrated circuit. According to the invention, the internal peripherals comprise circuits called options circuits enabling the operations of these peripherals to be configured as a function of stored information elements for an operating session corresponding to putting the integrated circuit into service. The memory comprises a first part to store the stored information elements relating to options and a second part to store information elements that can be executed by the microcontroller. This first part of the memory is of the type that can also be written in under the control of a microprocessor, notably the microprocessor of the integrated circuit.

BRIEF DESCRIPTION OF THE DRAWINGS

The invention will be understood more clearly from the following description of an embodiment given by way of a non-restrictive example, and from the appended drawings of which.

MORE DETAILED DESCRIPTION

Figure 1:
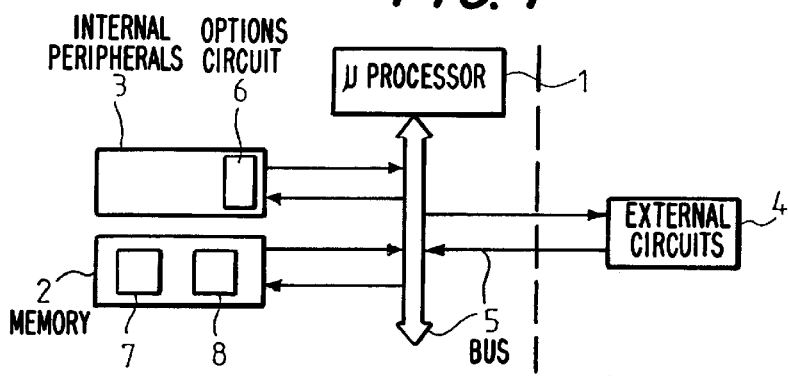
FIG. 1 shows the structure of the integrated circuit of the invention in its environment.

Referring to FIG. 1, the integrated circuit of the invention is formed by a microprocessor 1 connected to a connection circuit or connection bus 5 to which there are also connected a memory 2, internal peripherals 3 and external circuits 4. The peripherals 3 are internal to the integrated circuit and comprise so-called options circuits 6. The memory 2 is constituted by a first part 7 in which there are stored information elements relating to the peripherals, and a second part 8 designed to store instructions that can be executed by the microprocessor 1. The connection bus 5 is constituted by an address bus 25, a control bus 26 and a data bus 15 illustrated in FIG. 3.

The options circuits 6 of the peripherals 3 enable the configuration of the operation of these peripherals. The selection of the configuration takes place for a operation session corresponding to a putting into service of the integrated circuit.

The first part 7 of the memory is of an EPROM type. With regard to the second part of the memory, it can be envisaged that it is of a ROM type, the user's freedom being limited to the choice of the options.

However, since the advantage of the EPROM circuit results inter alia from the facility of developing an application before launching a mass production of circuits in a ROM version, this choice may be considered to be of little value. Thus, at present, the invention has preferred practical utility when the second part 8 of the memory too is of the EEPROM type. In this case, the distinction between the two parts is above all functional. Physically, the two parts are related and the only distinction between them relates to the addresses of their respective zones. It is even possible, preferably, to fix a certain data byte of the memory so that it corresponds to the first part of the memory. The address of this data element can furthermore be definitively fixed by the manufacturer. One byte may suffice to define the options in view of the small number of internal peripheral circuits and the small number of modes of operation possible for these peripherals.

Figure 2:
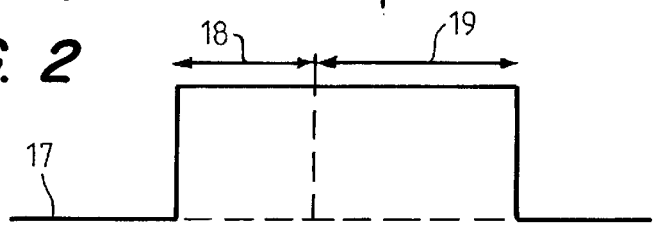
FIG. 2 shows a signal representing the putting into operation of the integrated circuit of FIG. 1.

The putting into service of the integrated circuit is activated by a binary signal 17, illustrated in FIG. 2 and commonly called RESET. In the case being dealt with here, this signal temporally comprises two successive phases. Assuming that the signal is determined so as to act in the high state, the phase that can be distinguished first of all is a phase for the physical initialization of the circuit, during a period 18 that corresponds to build-up and stabilization of the supplies of the integrated circuit. This phase is followed by a phase for the configuration of the internal peripherals, during a period 19, the microprocessor being disconnected from the data bus 15 by a circuit 16 shown in FIG. 3. The circuit 16 receives, for example, the signal of FIG. 2 on a control input. The microprocessor can act on the data bus 15 only when the signal 17 of FIG. 2 goes back to the low state. The circuit 16 makes it possible to ensure that the microprocessor 1 does not drive the data bus 5 during the phase of putting the integrated circuit into service. It is possible, if necessary, to do without the physical presence of the circuit 16.

This disconnection is done because the microprocessor is programmed to work in a particular configuration of the set of peripherals. It is therefore preferable to isolate this microprocessor in during a configuration phase, to prevent possible operational hitches and the possible blocking of the circuit. The information elements on options are transferred from the memory 2 to the peripherals 3 through the data bus 15.

The configuration of the peripherals 3 is made possible by a linking of these peripherals to the first part of the memory during the phase 19.

Figure 3:
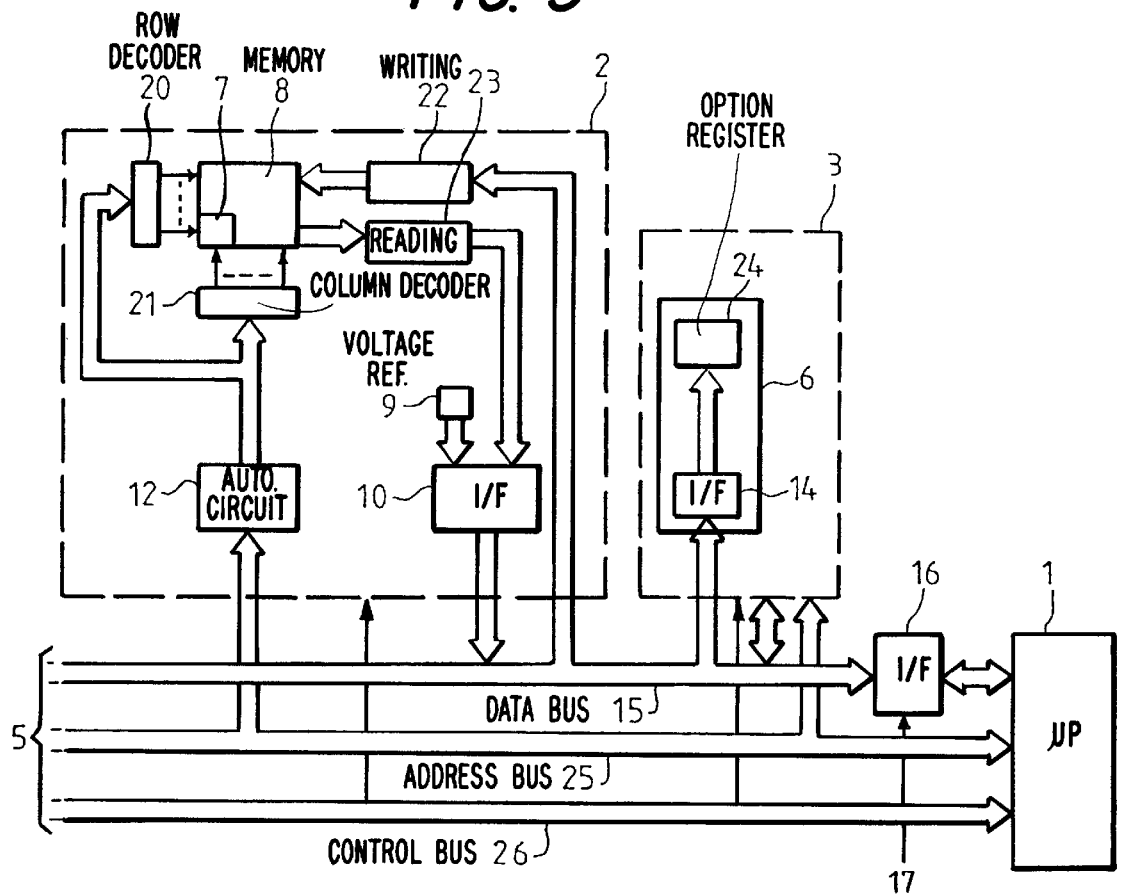
FIG. 3 is the functional diagram of a part of the integrated circuit representing the memory, an internal peripheral, the microprocessor and the connections among these elements.

Referring to FIG. 3, the memory 2 is formed by a first part 7 and a second part 8 of memory cells and circuits needed for the reading and writing of these memory cells. These memory cells are accessible by means of two decoders 20 and 21 corresponding respectively to the lines and columns of the memory map formed by the parts 7 and 8 of the memory. These decoders 20 and 21 decode addresses coming from the address bus 25 by means of an automatic circuit 12 during the phase 19.

The memory 2 also has two circuits 22 and 23, the first one being designed for writing in the memory and the second being designed for the reading of the memory. The writing circuit 22 is connected, firstly, to the memory map and, secondly, to the data bus 15. The reading circuit 23 is connected firstly to them memory map and secondly to the data bus 15 by means of a circuit 10. This circuit 10 is also connected to a voltage reference type of circuit hereinafter called an electrical recall circuit 9. The circuit 10 is used as needed to modify the transfer of the data elements from the memory to the data bus 15 when the system is in programming mode. The electrical recall circuit 9 is a wired circuit that gives a determined, binary voltage. In a preferred way, this voltage is given by a direct connection to the supply of the circuit or to the ground. It can also be formed by mounting two inverters back-to-back, as is the case with the inverters 44 and 45 of FIG. 7.

Furthermore, FIG. 3 also represents an internal peripheral 3 connected to the rest of the integrated circuit by the connection circuits 5. This peripheral 3 has a circuit called an options circuit 6, comprising notably an option register 24 connected to the data bus 15 by means of a circuit 14. This option register 24 contains a binary value that represents a code representing a configuration of the peripheral. It is the loading, into this register, of information elements stored in the first part of the memory that enables the configuration of the peripherals. The logic levels available in this register act directly on electrical nodes of the circuit 6.

FIG. 3 makes it possible to establish the functional context of the invention. FIGS. 4 to 7 illustrate the embodiments that can be used to implement the loading, into the option registers 24, of the necessary information elements coming from the memory 7.

It is possible to conceive of several possibilities for the loading, into the option register 24, of the peripherals of the default binary values. These default values correspond to a case of non-programming by the user. This case of non-programming arises at least during the first operation for putting the integrated circuit into service. It occurs also when the memory 2 has been erased.

In a first embodiment, these default binary values are given by the electrical recall circuits 9. It is possible in this case to envisage the wiring of these electrical recall circuits at the time of their manufacture, the circuit 10 connecting these electrical recall circuits 9 to the data bus in place of the memory reading circuit. This approach is shown schematically in FIG. 4. The wired circuits may be also used when the memory 2 (and especially the first part 7) is already partly programmed. Whatever may be the value programmed in the first part 7 of the memory 2, the working of the circuit is always the same in programming mode. It is also possible, in another mode, to envisage the prompting of the reading of the zone 7 in the non-programmed state. This embodiment is shown schematically in FIG. 5. The term "non-programmed memory" is taken to mean a memory wherein all or a part of the memory cells are in one and the same state. This state arises either when the unit leaves the production line, before any programming, or after an erasure operation. The value of this state is a function of the technology used.

Figure 4:
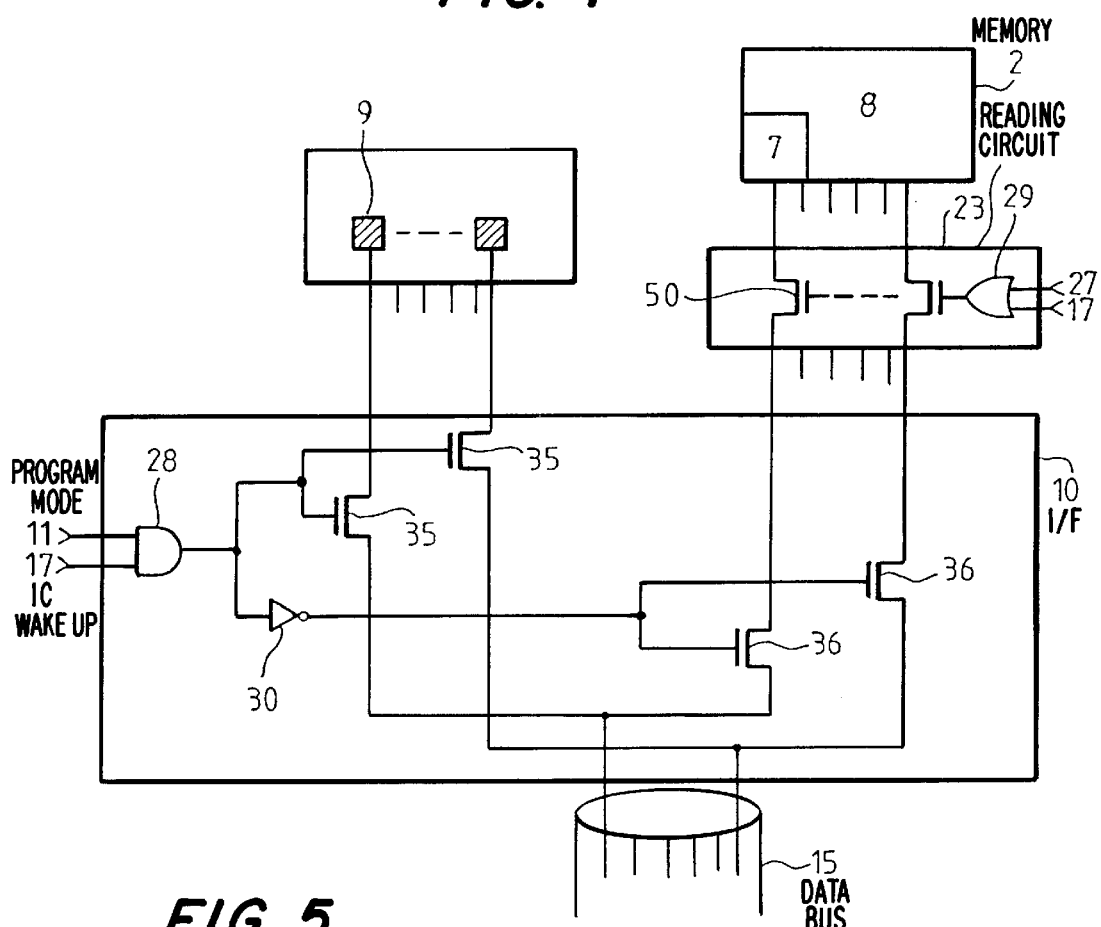
FIG. 4 shows an example of a configuration of the circuit for the transfer of the data elements read in the memory to the data bus, the means for the configuration by default of the circuits known as options circuits consisting of electrical reference or electrical recall circuits.

Referring to FIG. 4, it is possible to make a transfer, to the data bus 15, of either a data element read in the memory 2 by means of the reading circuit 23 or a data element physically determined by electrical recall circuits 9. The reading circuit 23 comprises inter alia in the example, schematically, transistors 50 controlled by the output of an OR gate with two inputs. There are as many transistors 50 as there are wires on the data bus 15. The two inputs of this OR gate 29 are respectively supplied with a read signal command 27 and the signal 17 for putting the integrated circuit into service. The transistors 50 are used as switches to cut off the data lines coming from the memory 2 and going to the data bus 15.

To simplify matters, it will be assumed that, firstly, a line coming from the memory 2 (constituted by two parts 7 and 8) and, secondly, a line of the electrical recall circuit 9 are made to correspond to each data line of the bus 15. In the example illustrated in FIG. 4, the circuit 10 comprises sets of transistors 35 and 36 respectively connected, firstly, to the lines of the electrical recall circuit 9 and, secondly, to the lines coming from the memory 2. These transistors 35 and 36 act as switches controlled directly by the output of a two-input AND gate 28 for the transistors 35. The AND gate 28 receives, at its two inputs, a signal 11 for indicating the programming mode and the signal 17 for putting the integrated circuit into service. For the transistors 36, the output of the AND gate 28 is connected to the input of an inverter 30 whose output is used to control the transistors. On the whole, the circuit 10 therefore has a switch-over function. In another embodiment, it is possible to connect the electrical recall circuits 9 to the peripherals.

Figure 5:
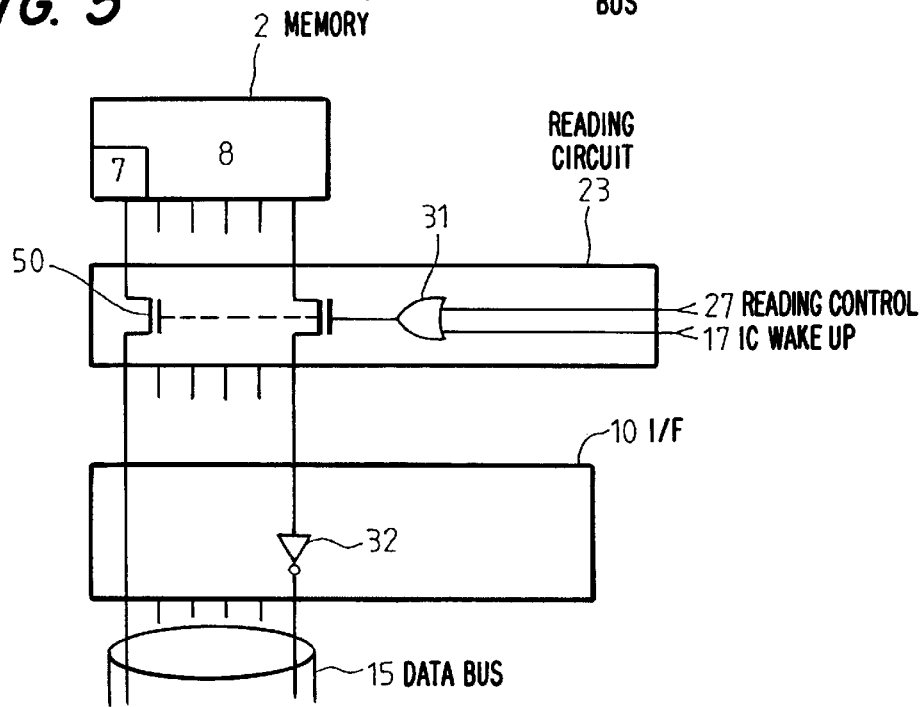
FIG. 5 shows an example of a possible configuration of the circuit for the transfer of the data elements read in the memory to the data bus, the means for the configuration by default of the circuits called options circuits comprising a reading of the first part of the memory in the non-programmed state.

FIG. 5 illustrates another mode of operation. The reading circuit 23 of FIG. 5 differs from that of FIG. 4 with regard to the control of the transistors 50. In the case of FIG. 5, the transistors 50 are controlled by the output of a two-input OR gate 31. The two inputs of this OR gate 31 are connected respectively to inputs receiving read control signals 27 and signals 17 for putting the integrated circuit into operation. This configuration can be applied to the case where it is desired to use solely the memory cells of the first part of the memory 2 to configure the peripherals. In this case, the memory cells of the part 7 of the memory 2 also contain the default configuration. This simplifies the circuit 10. In practice some caution may be appropriate with respect to this choice for there may be some uncertainty on the values of the memory cells of the memory before any programming or after erasure if the erasure is not accurate.

As compared with the principle illustrated in FIG. 4, the circuit 10 may be simplified in the principle illustrated by FIG. 5. If the non-programmed state corresponds to a configuration accepted by the user, it is possible to connect the read circuit directly to the data bus. It is also possible, for reasons of convenience, to change the value of the non-programmed state by adding an inverter gate 32 between one of the inputs or all the inputs of the reading circuit, on the one hand, and the data bus on the other hand. It will be recalled that the values of the memory cells of the first part of the memory are then not all equal to one another and to the non-programmed state, seen from the bus 15. It is also possible to design a switching circuit that would reverse to the non-programmed state in programming mode and that would not reverse in another mode.

So that the user may be capable of programming the choice of his options, he should know the address at which the information is located.

Figure 6:
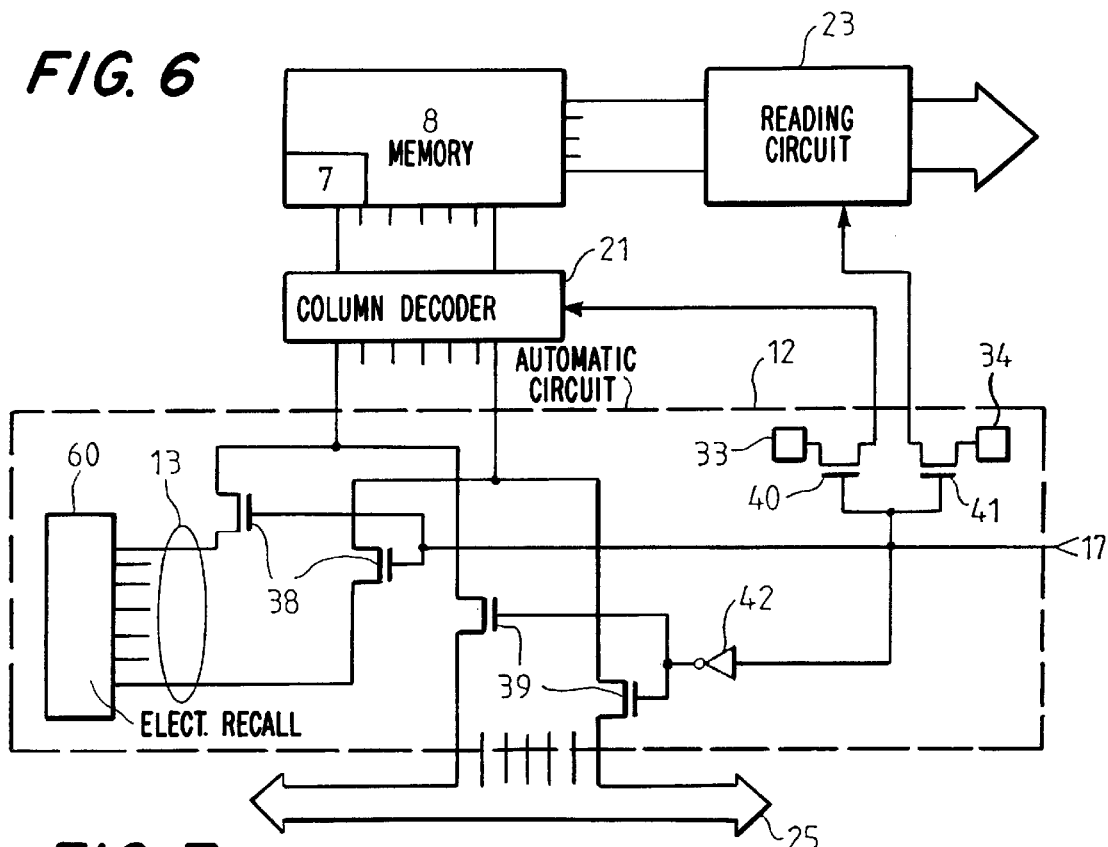
FIG. 6 shows a possible configuration of the automatic circuit that produces a read address in the first part of the memory when the integrated circuit is put into service and that activates the reading of said memory at the address indicated.

FIG. 6 shows a possible approach to the making of the automatic circuit 12. The addresses of the memory cells to be read are sent to the memory 2 via the address bus 25, by means of the circuit 12. The selection of a memory cell is done by the decoders 20 and 21 (the figure shows only the column decoder 21 to simplify the drawing). The address given to the decoder 21 comes either from the bus or from an electrical recall circuit 60 that gives a binary signal 13 of a same type as the address signal (equivalent number of bits).

To each line of the bus 15, there corresponds a line connected to this electrical recall circuit 60. These lines therefore have a common point. The lines are isolated from this point by transistors 38 and 39 that act as switches and thus enable the selection of the signal sent to the decoders.

In this example, the selection is controlled for the transistors 38 by the signal 17 for putting the integrated circuit into service. The transistors 39 are controlled by the output of an inverter 42 to whose input there is applied the signal 17 for putting the integrated service into service. Furthermore, the signal 17 for putting the integrated circuit into service controls two transistors 40 and 41 that act as switches between two circuits 33 and 34 and control inputs of the decoders and of the reading circuit. Each of the circuits 33 and 34 permanently gives a control voltage. This assembly is used to control the reading of the memory at the desired address.

Figure 7:
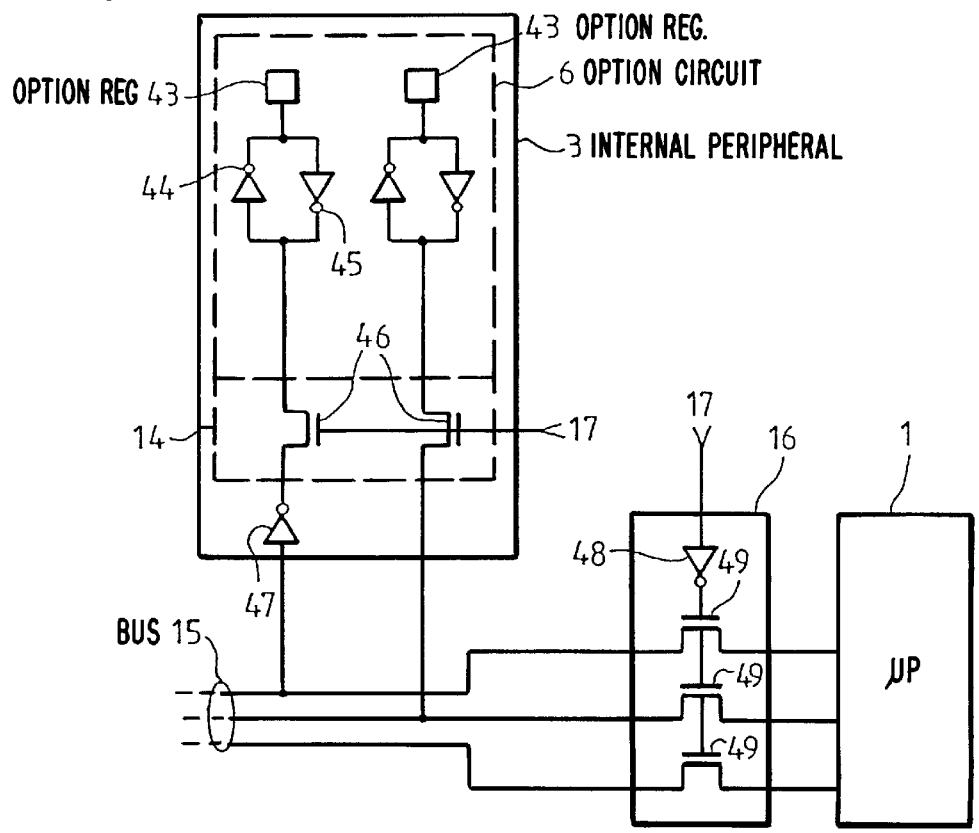
FIG. 7 shows a part of the integrated circuit corresponding to a detailed view of a possible configuration of the options circuit of a peripheral and of the circuit for decoupling the microprocessor from the bus.

Referring to FIG. 7 it is considered, in the example, that the peripheral has an option encoded on two option registers 43 each corresponding to a binary value. Each of these two registers is connected to a line of the data bus 15 by means of an electrical recall circuit constituted by two inverters 44 and 45 mounted back-to-back and a transistor 46. The set of transistors 46 constitutes the circuit 14 for the connection of options circuits to the data bus 15. These transistors 46, which are used as switches, are controlled by the signal 17 for putting the integrated circuit into service. For one of the two registers 43, there is furthermore interposed an inverter 47 between the transistor 46 and the corresponding wire of the bus. This optional inverter is a means of obtaining the adequate signal during a default configuration with reading of the erased memory. It therefore plays the same role as the inverter 32 of FIG. 5.

The circuit 16 for the disconnection of the microprocessor of the data bus 15 is shown schematically in FIG. 7. In the example, it is constituted by a set of transistors 49 used as switches on the lines of the bus 15. These transistors are controlled by the output signal of an inverter 48, the input of this inverter being controlled to the signal 17 for putting the integrated circuit into service.

Although only one preferred mode of operation has been described and shown, it is clear that any modification made by those skilled in the art in the same spirit will not constitute a departure from the framework of the invention.

What is claimed is:

1. An integrated circuit comprising:
    a microprocessor which must have a plurality of information elements relating to options defined before said microprocessor can function;
    a memory accessible with an address decoder;
        wherein said memory comprises a first part to store said information elements and a second part to store information elements that can be executed by said microprocessor;
    one or more internal peripherals connected to a data bus, said internal peripherals comprising options circuits which enable said internal peripherals to be configured as a function of said information elements for putting said integrated circuit into service;
        wherein said options circuits possess means for being configured by default for a particular mode of operation of said microprocessor called the programming mode, and when in said programming mode, said microprocessor is capable of writing into said first part of said memory;
        wherein said means for being configured by default comprises a hard-wired electrical circuit; wherein said integrated circuit transfers option information directly from said hard-wired electrical circuit to said options circuits of said internal peripherals;
        and wherein said means for being configured by default comprises a circuit for the modification of said information elements relating to options, said modification circuit being activated by a signal that enables said microprocessor to be placed in programming mode;
    said integrated circuit being connected to receive a reset signal for putting into service said integrated circuit, said reset signal having a binary signal comprising two phases, a first phase for a physical initialization of said integrated circuit and a second phase for a configuration of said internal peripherals;
    a reading circuit for reading said information elements from said first part of said memory and imposing logic states corresponding to said information elements on certain electrical nodes of electronic circuits connected to said peripherals during said second phase; and
    a disconnect circuit comprising a second part for authorizing said microprocessor to manage said integrated circuit only at the end of said second phase.

2. An integrated circuit according to claim 1, wherein said means for being configured by default comprise a reading of said first part of said memory in a non-programmed state.

3. An integrated circuit according to claim 1, further comprising an automatic circuit which, when said integrated circuit is being put into service, produces a binary signal representing a reading address in said first part of said memory, said address corresponding to the stored information elements relating to the operations of said peripherals, said automatic circuit controlling the reading of said memory at the address indicated.

4. An integrated circuit according to claim 1, wherein said options circuits of said peripherals comprise a circuit for being connected to said data bus at the end of said second phase of said reset signal.

5. An integrated circuit according to claim 1, wherein said microprocessor is decoupled from said data bus by said disconnect circuit during said second phase of said reset signal, during which a link between said options circuits of said peripherals and said first part of said memory takes place.

6. The integrated circuit of claim 1, wherein said first and second memory parts both comprise EEPROM.

7. The integrated circuit of claim 1, wherein one bit of said first part of said memory selects between operation from a quartz clock and operation from an oscillator.

8. The integrated circuit of claim 1, wherein said internal peripherals include a converter circuit, and one bit of said first part of said memory selects faster or slower operation of said converter circuit.

9. The integrated circuit of claim 1, further comprising circuitry for selectably forcing said first part of said memory into programming mode at startup.

10. The integrated circuit of claim 1, wherein said internal peripherals include a counter, and one bit of said first part of said memory selects fast or slow operation of said counter.

11. A microcontroller integrated circuit, comprising:
- a microprocessor portion;
- a bus;
- a disconnection circuit interposed between said microprocessor portion and said bus, said disconnection circuit being configured to cut off access from said microprocessor portion to said bus whenever power is first applied to the integrated circuit;
- a nonvolatile instruction memory, operatively connected in such relation that said microprocessor portion can fetch instructions from said instruction memory when said disconnection circuit is not cutting off access thereto;
- one or more internal peripheral circuits, each operatively connected to said bus and comprising a respective options circuit; and
- a nonvolatile peripheral-configuration memory;
- wherein, when power is first applied, said options circuits of said internal peripheral circuits retrieve configuration data from said peripheral-configuration memory, and implement corresponding interface options for said peripheral circuits; and thereafter said microprocessor portion can interface through said bus to said peripheral circuits and to external connections.

12. The integrated circuit of claim 11, wherein said bus includes a plurality of data lines, a plurality of address lines, and a plurality of control lines.

13. The integrated circuit of claim 11, wherein said instruction memory and said peripheral-configuration memory both comprise EEPROM.

14. The integrated circuit of claim 11, wherein said instruction memory has separate read and write interfaces.

15. The integrated circuit of claim 11, further comprising hardware connections which define a default set of configuration options before said peripheral-configuration memory has been written.

16. The integrated circuit of claim 11, wherein said peripheral circuits include a counter, and one bit of said peripheral-configuration memory selects fast or slow operation of said counter.

17. The integrated circuit of claim 11, further comprising circuitry for selectably forcing said peripheral-configuration memory into programming mode at startup.

18. An integrated circuit microcontroller comprising, on a single chip:
- a microprocessor;
- first and second memory parts; and
- at least one internal peripheral circuit connected to said microprocessor and said memory by a data bus, and comprising an options circuit which, at power-up, automatically reads data from said first memory part and configures the operation of said internal peripheral circuit accordingly, without the intervention of said microprocessor;
- wherein said internal peripheral circuit is selected from the group consisting of clock circuits and data conversion circuits;
- wherein said microprocessor executes programs from said second memory part, in operations which depend on the configuration of said peripheral circuit;
- wherein said options circuits possess means for being configured by default for a particular mode of operation of said microprocessor called the programming mode and wherein, in this particular mode, said microprocessor is capable of writing in said first part of said memory.

19. An integrated circuit microcontroller according to claim 18, wherein said means for being configured by default comprise a hard-wired electrical circuit.

20. An integrated circuit microcontroller according to claim 18, wherein said means for being configured by default comprise a circuit for the modification of information elements relating to options, this modification circuit being activated by a signal that enables said microprocessor to be placed in programming mode.

21. An integrated circuit microcontroller according to claim 20, wherein said microprocessor is decoupled from said data bus by a disconnect circuit during power-up, during which a link between said options circuits of said peripherals and said first part of said memory takes place.

22. An integrated circuit microcontroller according to claim 18, wherein said means for being configured by default comprise a reading of said first part of said memory in a non-programmed state.

23. The integrated circuit microcontroller of claim 18, wherein said first and second memory parts both comprise EEPROM.

24. The integrated circuit microcontroller of claim 18, wherein one bit of said first part of said memory selects between operation from a quartz clock and operation from an oscillator.

25. The integrated circuit microcontroller of claim 18, wherein said internal peripherals include a converter circuit, and one bit of said first part of said memory selects faster or slower operation of said converter circuit.

26. The integrated circuit microcontroller of claim 18, further comprising circuitry for selectably forcing said first part of said memory into programming mode at startup.

27. The integrated circuit microcontroller of claim 18, wherein said bus includes a plurality of data lines, a plurality of address lines, and a plurality of control lines.

28. The integrated circuit microcontroller of claim 18, wherein said instruction memory has separate read and write interfaces.

29. The integrated circuit microcontroller of claim 18, further comprising hardware connections which define a default set of configuration options before a peripheral-configuration memory has been written.

30. An integrated circuit microcontroller comprising, on a single chip:
- a microprocessor;
- a memory comprising first and second parts;
- at least one internal peripheral circuit connected to said microprocessor and said memory by a data bus, and comprising an options circuit which, at power-up, automatically reads data from said first part of said memory and configures the operation of said internal peripheral circuit accordingly, without the intervention of said microprocessor; and
- a disconnection circuit interposed between said microprocessor and said bus, said disconnection circuit being configured to cut off access from said microprocessor portion to said bus, while allowing access from said options circuit to said bus, whenever power is first applied to the integrated circuit;
- wherein said microprocessor executes programs from said second memory part, in operations which depend on the configuration of said peripheral circuit.

31. An integrated circuit microcontroller according to claim 30, wherein said options circuits possess means for being configured by default for a particular mode of operation of said microprocessor called the programming mode and wherein, in this particular mode, said microprocessor is capable of writing in said first part of said memory.

32. An integrated circuit microcontroller according to claim 31, wherein said means for being configured by default comprise a hard-wired electrical circuit.

33. An integrated circuit microcontroller according to claim 31, wherein said means for being configured by default comprise a circuit for the modification of information elements relating to options, this modification circuit being activated by a signal that enables said microprocessor to be placed in programming mode.

34. An integrated circuit microcontroller according to claim 31, wherein said means for being configured by default comprise a reading of said first part of said memory in a non-programmed state.

35. An integrated circuit microcontroller according to claim 30, further comprising an automatic circuit which, when said integrated circuit microcontroller is being put into service, produces a binary signal representing a reading address in said first part of said memory, said address corresponding to stored information elements relating to the operations of said peripherals, said automatic circuit controlling the reading of said memory at the address indicated.

36. The integrated circuit microcontroller of claim 30, wherein said first and second memory parts both comprise EEPROM.

37. The integrated circuit microcontroller of claim 30, wherein one bit of said first part of said memory selects between operation from a quartz clock and operation from an oscillator.

38. The integrated circuit microcontroller of claim 30, wherein said internal peripherals include a converter circuit, and one bit of said first part of said memory selects faster or slower operation of said converter circuit.

39. The integrated circuit microcontroller of claim 30, further comprising circuitry for selectably forcing said first part of said memory into programming mode at startup.

40. The integrated circuit microcontroller of claim 30, wherein said internal peripherals include a counter, and one bit of said first part of said memory selects fast or slow operation of said counter.

41. The integrated circuit microcontroller of claim 30, wherein said bus includes a plurality of data lines, a plurality of address lines, and a plurality of control lines.

42. The integrated circuit microcontroller of claim 30, wherein said instruction memory has separate read and write interfaces.

43. The integrated circuit microcontroller of claim 30, further comprising hardware connections which define a default set of configuration options before a peripheral-configuration memory has been written.

* * * * *